United States Patent Office 2,792,385
Patented May 14, 1957

2,792,385
MONOAZO-DYESTUFFS INSOLUBLE IN WATER

Ernst Fischer and Franz Muris, Offenbach (Main), Germany, assignors to Farbwerke Hoechst A. G., vormals Meister Lucius & Brüning, Frankfurt am Main Hochst, Germany, a company of Germany No Drawing. Application April 23, 1953,
Serial No. 350,758

Claims priority, application Germany April 30, 1952

7 Claims. (Cl. 260—203)

The present invention relates to new monoazo-dyestuffs insoluble in water and to fiber dyed therewith; more particularly it relates to dyestuffs corresponding to the following general formula:

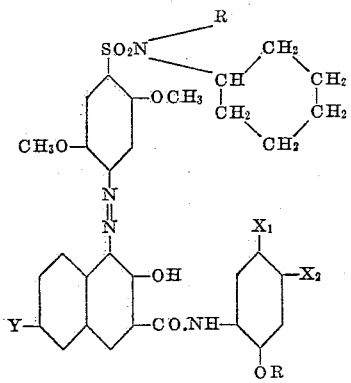

wherein R represents a methyl or ethyl group, one of the two substituents $X_1$ and $X_2$ stands for hydrogen or a halogen atom and the other stands for a methoxy or ethoxy group, and Y represents hydrogen, an alkoxy group or a halogen atom.

We have found that monoazo-dyestuffs insoluble in water are obtained by coupling in substance, on the fiber or on a substratum suitable for the production of lakes, a diazo-compound of an amine of the general formula:

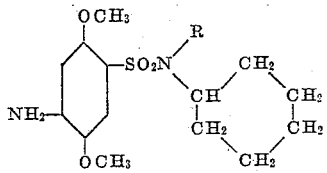

wherein R represents a methyl or ethyl group, with a phenylamide of 2.3-hydroxynaphthoic acid of the general formula:

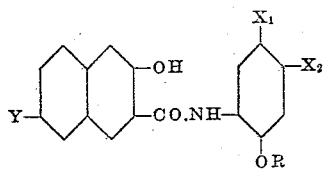

wherein one of the two substituents $X_1$ and $X_2$ stands for hydrogen or a halogen atom and the other stands for an —OR radical, R represents a methyl or ethyl group, and Y represents hydrogen or an alkoxy group or a halogen atom.

The dyestuffs can be produced on vegetable fibers, including regenerated cellulose, by dyeing or printing processes known for the production of ice colors or they can be produced in substance or on a substratum. The pigment dyestuffs obtained in the latter case can be applied to textiles by padding or printing in the presence of binding agents, and they can also be used for the production of spun-dyed acetate rayon and viscose rayon by incorporating them in the spinning solutions. They are also suitable for the preparation of color lakes and for the production of colored films by incorporating them in compositions containing cellulose esters or cellulose ethers. They are also suitable for coloring natural or artificial resins, such as the condensation products of formaldehyde with urea, phenols or amines.

Vivid, chiefly claret to red-violet tints are obtained which possess a very good fastness to light and, when the dyestuffs are produced on the fiber, also a good fastness to wet processing and especially to peroxide. In this latter respect the new dyestuffs are distinctly superior to the comparable azo-dyestuffs described in German Patents No. 711,385 (table on page 3, dyestuff 23), No. 714,864 (Example 3), and No. 744,395 (Example 1).

The following examples serve to illustrate the invention, but they are not intended to limit it thereto.

Example 1

100 grams of cotton yarn are treated for 45 minutes at 35° C. in the impregnating bath described below, centrifuged and developed in the wet state at 20° C. in the developing bath described below. The yarn is then rinsed, soaped first at 60° C., then at the boil, and dried.

*Impregnation bath.*—9 grams of 1-(2'.3'-hydroxy-naphthoyl-amino)-2,4-dimethoxy-5-chlorobenzene are dissolved with 27 cc. of denatured alcohol, 3 cc. of sodium hydroxide solution of 38° Bé., 3 cc. of formaldehyde solution of 33 percent strength and 9 cc. of warm water. The whole is made up to 2 liters with water at 35° C., 20 grams of Turkey red oil of 50 percent strength, and 20 cc. of sodium hydroxide solution of 38° Bé.

*Developing bath.*—6.8 grams of 1-amino-2.5-dimethoxybenzene-4-sulfonic acid-N-ethylcyclohexylamide are ground with a solution of 1.6 grams of sodium nitrite in 9 cc. of water and then introduced into a mixture of 8.2 cc. of hydrochloric acid of 20° Bé. and 30 cc. of water. When the diazotization is complete, the whole is made up to 2 liters by adding cold water and 20 grams of sodium acetate.

A vivid claret dyeing of good fastness to peroxide and light is obtained.

If the impregnating bath described above is replaced by a bath obtained in a corresponding manner by dissolving 7 grams of 1-(6'-bromo-2'.3'-hydroxy-naphthoyl-amino)-2.4-dimethoxy-5-chlorobenzene with 14 cc. of denatured alcohol, 3.5 cc. of sodium hydroxide solution of 38° Bé., 3.5 cc. of formaldehyde solution of 33 percent strength and 14 cc. of warm water, and the whole is analogously made up to 2 liters, a claret but much more bluish dyeing is obtained having the same fastness properties.

Example 2

100 grams of cotton yarn are treated as described in Example 1 by using the impregnating and developing baths described below.

*Impregnation bath.*—9 grams of 1-(2'.3'-hydroxy-napthoyl-amino)-2.5-dimethoxybenzene are dissolved with 18 cc. of denatuerd alcohol, 4.5 cc. of sodium hydroxide solution of 38° Bé., 4.5 cc. of formaldehyde solution of 33 percent strength and 18 cc. of hot water. The whole is made up to 2 liters with water at 35° C., 20 grams of Turkey red oil of 50 percent strength and 20 cc. of sodium hydroxide solution of 38° Bé.

*Developing bath.*—6.5 grams of 1-amino-2.5-dimethoxybenzene-4-sulfonic acid-N-methylcyclohexylamide are diazotized and the diazo-solution is made up to 2 liters in the same manner as described in Example 1.

A dyeing of a similar tint as that described in Example 1 and of good fastness to peroxide and light is likewise obtained.

Example 3

20 parts by weight of a dyestuff preparation consisting of equimolecular quantities of 1-(2'.3'-hydroxy-naphthoyl-amino)-2.4-dimethoxy-5-cholorobenzene and the diazo-amino compound of 1-amino-2.5-dimethoxybenzene-4-sulfonic acid-N-ethylcyclohexylamide with methyltaurine are dissolved with 50 parts by weight of denatured alcohol, 10 parts by weight of sodium hydroxide solution of 38° Bé. and 150 parts by weight of water at 50° C. The solution is stirred into 500 parts by weight of starch-tragacanth thickening to which there are added 10 parts by weight of sodium hydroxide solution of 38° Bé. and 260 parts by weight of water.

The resulting printing color is printed on a cotton or viscose fabric, which is then dried, and steamed for 5 minutes at 102° C. in damp steam mixed with the vapors of acetic acid and formic acid, rinsed, soaped at the boil, rinsed again, and dried.

A bright claret print of very good fastness to light is obtained.

Example 4

17.1 parts by weight of 1-amino-2.5-dimethoxybenzene-4-sulfonic acid-N-ethylcyclohexylamide are diazotized in the usual manner. In order to eliminate the excess of mineral acid, sodium acetate is added to the diazo-solution, which is then stirred into an aqueous suspension of 17.9 parts by weight of 1-(2'.3'-hydroxy-naphthoyl-amino)-2.5-dimethoxy-4-chlorobenzene, the suspension being prepared by dissolving the latter compound in dilute sodium hydroxide solution and precipitating it with acetic acid. The dyestuff which is rapidly formed on heating to 40° C. is filtered off after completion of the coupling, washed well, and dried. It is a claret powder which can be used for the production of pigment prints on textiles by one of the usual methods, for instance by using an emulsion of polyvinyl acetate and a water-soluble, hardenable condensate of urea and formaldehyde. The print so obtained has a claret tint and possesses good fastness properties, especially a very good fastness to light.

Example 5

16.4 parts by weight of 1-amino-2.5-dimethoxybenzene-4-sulfonic acid-N-methylcyclohexylamide are diazotized in the usual manner. The diazo-solution is rendered neutral to Congo-paper with sodium acetate and is stirred into a suspension of 17.9 parts by weight of 1-(2'.3'-hydroxynaphthoyl - amino) - 2.4 - dimethoxy - 5 - chlorobenzene, the suspension being prepared by dissolving the latter compound in alcohol and dilute sodium hydroxide solution and precipitating it with acetic acid. On heating to 40° C. a claret dyestuff is rapidly formed which after completion of the coupling, is filtered off, washed well and dried. Lacquers prepared with this dyestuff yield claret tints of very good fastness to light.

The coupling can also be carried out in the presence of a carrier suitable for the preparation of color lakes. The dyestuff corresponds to the following formula:

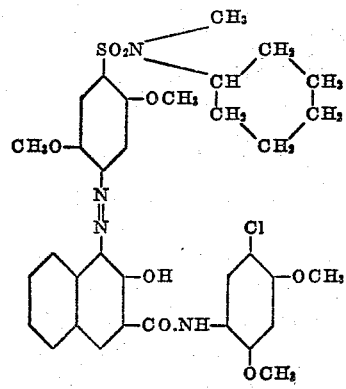

Example 6

In the procedure described in Example 5, 20.1 parts by weight of 1-(2'.3'-hydroxy-naphthoyl-amino)-2.4-dimethoxy-5-bromobenzene are used, instead of 17.9 parts by weight of 1-(2'.3'-hydroxy-naphthoyl-amino)-2.4-dimethoxy-5-chlorobenzene, and a dyestuff of similar tint is obtained. 0.5 part by weight of this dyestuff is added to 100 parts by weight of the condensation product of urea and formaldehyde containing 30 percent of wood meal as a filler, and the resulting mixture is ground for 12 hours in a ball mill. The mass is then placed in a press and moulded and hardened for 5 minutes at 140° C. under pressure to form the desired moulded article.

In the following table are given further components which can be used according to the present invention, and the tints of the monoazo-dyestuffs so obtained, which dyestuffs likewise possess good fastness properties.

| Diazo-component | Coupling component | Tint |
|---|---|---|
| 1-amino-2.5-dimethoxybenzene-4-sulfonic acid-: N-methyl-cyclohexylamide. | 1-(2'.3'-hydroxy-naphthoyl-amino)-: -2.5-dimethoxy-4-chlorobenzene. | claret. |
| Do | -2.4-dimethoxybenzene | Do. |
| Do | -2.4-dimethoxy-5-bromobenzene | Do. |
| Do | -2.5-diethoxy-4-chlorobenzene | Do. |
| Do | -2.5-dimethoxy-4-bromobenzene | Do. |
| N-ethyl-cyclohexylamide. | -2.5-dimethoxybenzene | Do. |
| Do | -2.4-diethoxybenzene | Do. |
| Do | -2.4-dimethoxy-5-bromobenzene | Do. |
| Do | -2.5-diethoxy-4-chlorobenzene | Do. |
| Do | 1-(6'-bromo-2'.3'-hydroxy-naphthoyl-amino)-: -2.5-dimethoxy-4-chlorobenzene. | red-violet. |
| Do | -2.4-dimethoxybenzene | Do. |
| N-methyl-cyclohexylamide. | -2.4-dimethoxy-5-chlorobenzene | Do. |
| Do | 1-(6'-methoxy-2'.3'-hydroxy-naphthoyl-amino)-2.4-dimethoxy-5-chloro-benzene. | Do. |

We claim:

1. The monoazo-dyestuffs insoluble in water corresponding to the following general formula:

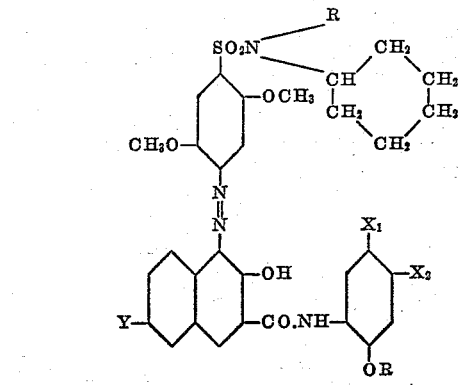

wherein R stands for one of the group consisting of methyl and ethyl, one of the two substituents $X_1$ and $X_2$ stands for a member of the group consisting of hydrogen, chlorine and bromine and the other stands for a member of the group consisting of methoxy and ethoxy, and Y stands for a member of the group consisting of hydrogen, methoxy and bromine.

2. The monoazo-dyestuffs insoluble in water corresponding to the following general formula:

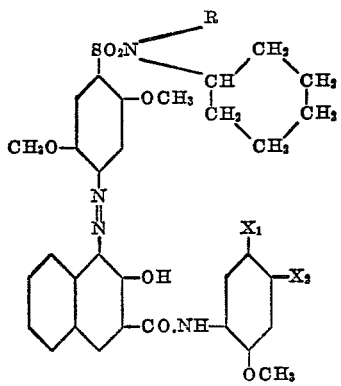

wherein R stands for one of the group consisting of methyl and ethyl, one of the two substituents $X_1$ and $X_2$ stands for a member of the group consisting of hydrogen, chlorine and bromine and the other stands for methoxy.

3. The monoazo-dyestuff insoluble in water corresponding to the following formula:

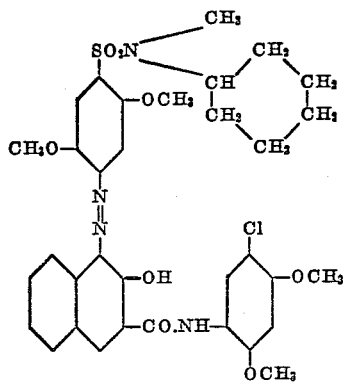

4. The monoazo-dyestuff insoluble in water corresponding to the following formula:

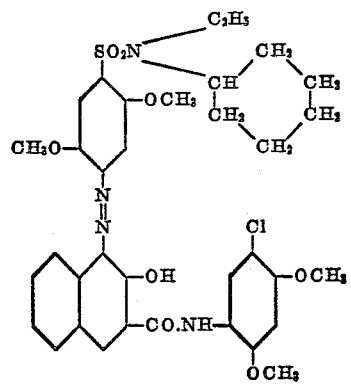

5. The monoazo-dyestuff insoluble in water corresponding to the following formula:

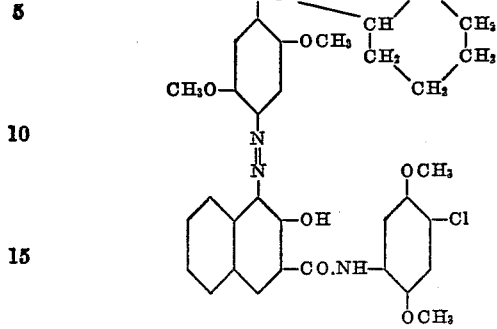

6. The monoazo-dyestuff insoluble in water corresponding to the following formula:

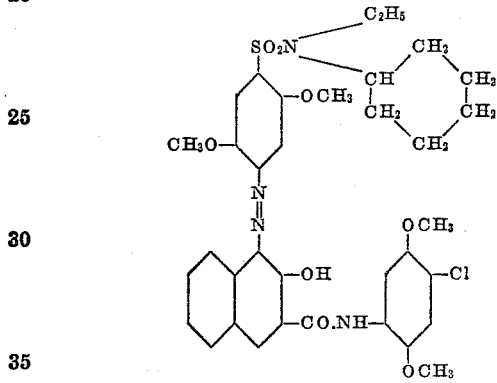

7. The monoazo-dyestuff insoluble in water corresponding to the following formula:

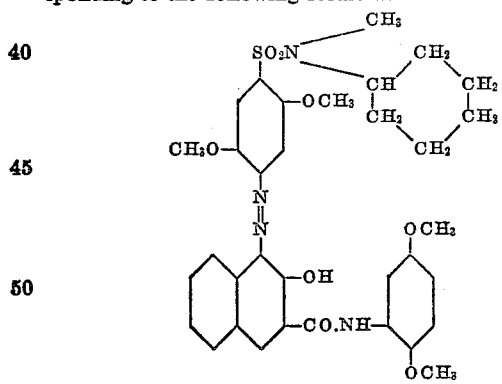

References Cited in the file of this patent

UNITED STATES PATENTS

| | | |
|---|---|---|
| 1,927,115 | Eichwede | Sept. 19, 1933 |
| 1,995,932 | Laska et al. | Mar. 26, 1935 |
| 2,000,313 | Zitscher et al. | May 7, 1935 |
| 2,210,072 | Fischer | Aug. 6, 1940 |

FOREIGN PATENTS

| | | |
|---|---|---|
| 711,385 | Germany | Sept. 16, 1938 |